(12) United States Patent
Holzer et al.

(10) Patent No.: US 10,949,978 B2
(45) Date of Patent: Mar. 16, 2021

(54) AUTOMATIC BACKGROUND REPLACEMENT FOR SINGLE-IMAGE AND MULTI-VIEW CAPTURES

(71) Applicant: Fyusion, Inc., San Francisco, CA (US)

(72) Inventors: Stefan Johannes Josef Holzer, San Mateo, CA (US); Matthias Reso, San Francisco, CA (US); Abhishek Kar, Berkeley, CA (US); Julius Santiago, San Francisco, CA (US); Pavel Hanchar, Minsk (BY); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 9 days.

(21) Appl. No.: 16/518,512

(22) Filed: Jul. 22, 2019

(65) Prior Publication Data

US 2020/0234451 A1 Jul. 23, 2020

Related U.S. Application Data

(60) Provisional application No. 62/795,429, filed on Jan. 22, 2019, provisional application No. 62/795,440, filed on Jan. 22, 2019.

(51) Int. Cl.
*G06T 7/194* (2017.01)
*G06T 11/40* (2006.01)
*G06T 5/00* (2006.01)

(52) U.S. Cl.
CPC .............. *G06T 7/194* (2017.01); *G06T 5/005* (2013.01); *G06T 11/40* (2013.01); *G06T 2207/10024* (2013.01); *G06T 2207/20132* (2013.01)

(58) Field of Classification Search
CPC ................ G06T 11/00; G06T 11/40; G06T 2207/10024; G06T 2207/20132; G06T 5/005; G06T 7/194
See application file for complete search history.

(56) References Cited

U.S. PATENT DOCUMENTS

| | | |
|---|---|---|
| 5,764,306 A | 6/1998 | Stefano |
| 5,923,380 A | 7/1999 | Yang et al. |
| 6,912,313 B2 | 6/2005 | Li |
| 2002/0063714 A1* | 5/2002 | Haas ................... H04N 21/812 345/473 |
| 2010/0251101 A1* | 9/2010 | Haussecker ........ H04N 5/23238 715/243 |

(Continued)

*Primary Examiner* — Michelle L Sams
(74) *Attorney, Agent, or Firm* — Kwan & Olynick LLP

(57) ABSTRACT

A segmentation of an object depicted in a first visual representation may be determined. The segmentation may include for each image a first respective image portion that includes the object, a second respective image portion that includes a respective ground area located beneath the object, and a third respective image portion that includes a background area located above the second respective portion and behind the object. A second visual representation may be constructed that includes the first respective image portion and a target background image portion that replaces the third respective image portion and that is selected from a target background image based on an area of the third respective image portion relative to the respective image.

18 Claims, 11 Drawing Sheets
(3 of 11 Drawing Sheet(s) Filed in Color)

(56) References Cited

U.S. PATENT DOCUMENTS

| | | | |
|---|---|---|---|
| 2014/0119604 A1* | 5/2014 | Mai | G06K 9/00624 |
| | | | 382/103 |
| 2015/0347845 A1* | 12/2015 | Benson | G06K 9/38 |
| | | | 382/103 |
| 2019/0196698 A1* | 6/2019 | Cohen | G10L 15/22 |
| 2020/0151860 A1* | 5/2020 | Safdarnejad | G06K 9/00221 |

* cited by examiner

AUTOMATIC BACKGROUND REPLACEMENT FOR SINGLE-IMAGE AND MULTI-VIEW CAPTURES

CROSS-REFERENCE TO RELATED APPLICATIONS

The present application claims priority under 35 U.S.C. 120 to U.S. Provisional Patent Application No. 62,795,429, titled "AUTOMATIC BACKGROUND REPLACEMENT FOR SINGLE- AND MULTI-VIEW CAPTURES", filed Jan. 22, 2019, by Holzer et al., which is hereby incorporated by reference in its entirety and for all purposes. The present application also claims priority under 35 U.S.C. 120 to U.S. Provisional Patent Application No. 62,795,440, titled "AUTOMATIC OBJECT ORIENTATION ESTIMATION IN VISUAL DATA", filed Jan. 22, 2019, by Holzer et al., which is hereby incorporated by reference in its entirety and for all purposes.

COLORED DRAWINGS

The patent or application file contains at least one drawing executed in color. Copies of this patent or patent application publication with color drawing(s) will be provided by the Office upon request and payment of the necessary fee.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the processing of visual digital media content, and more specifically to altering digital images.

DESCRIPTION OF RELATED ART

Images of objects are frequently captured using green screens or other specialized contexts to facilitate the replacement of the image background with a different background. By replacing pixels of a particular color with corresponding pixels in a replacement background image, the subject of the image may be made to appear in the replacement background image rather than in the initial background. However, such an approach requires the object in the video to be positioned in a specialized context such as a studio setting in which a green screen is available. Further, such an approach can make replacing the ground beneath the object difficult unless the object is not only placed in front of a green screen, but also sitting on top of a green screen. This approach is cumbersome and unwieldy, particularly when backgrounds need to be replaced for many objects or when the objects are large and heavy. Accordingly, improved techniques for background image replacement are desired.

OVERVIEW

Provided are various mechanisms and processes relating to the processing of visual media data. According to various embodiments, techniques and mechanisms described herein may facilitate image background replacement.

In some implementations, a segmentation of an object depicted in a first visual representation that includes one or more images of the object may be determined. The segmentation may include for each image a first respective image portion that includes the object, a second respective image portion that includes a respective ground area located beneath the object, and a third respective image portion that includes a background area located above the second respective portion and behind the object.

In some embodiments, a second visual representation may be constructed based on the first visual representation. The second visual representation may include the first respective image portion, and for each image a respective target background image portion that replaces the third respective image portion. The respective target background image portion may be selected from a target background image based on an area of the third respective image portion relative to the respective image. The second visual representation may be stored on a storage device.

In particular embodiments, the second respective image portion may be updated based on one or more adjusted ground luminance and/or color values determined for the first visual representation. The second visual representation may include the updated second respective image portion. The one or more adjusted ground luminance and/or color values may be determined so as to match the second respective image portion to a designated ground portion of the target background image. Alternately, or additionally, the second respective image portion may be updated based on one or more color channel adjustment values determined for the first visual representation.

In particular embodiments, the second respective image portion may be updated to remove one or more visual artifacts identified in the first visual representation. Alternately, or additionally, the second respective image portion may be updated to add the appearance of wetness.

In particular embodiments, the target background image may be selected based on one or more characteristics of the first visual representation. The one or more characteristics may include a first one or more ground plane vectors estimated for the target background image. The first one or more ground plane vectors may match a second one or more ground plane vectors estimated for the first visual representation.

In particular embodiments, for each of the images an estimated orientation of the object may be determined, relative to a respective viewpoint from which the respective image was captured. Alternately, or additionally, for each of the images an estimated transition boundary between the respective ground area and the respective background area may be determined.

In particular embodiments, the first visual representation may include a plurality of images of the object that were each captured from a respective perspective view. The respective target background image portion associated with an image may be determined based on the respective perspective view associated with the image. The first visual representation may include inertial measurement unit (IMU) data collected from an IMU in a mobile phone.

In particular embodiments, the object may be a vehicle. An updated position of the first respective image portion may be determined based on an initial position of the first respective image portion. The updated position may be a vertical translation, a horizontal translation, and/or a rotation. Alternately, or additionally, the second visual representation may be constructed at least in part by cropping the first respective image portion.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

DETAILED DESCRIPTION

Figure 1:
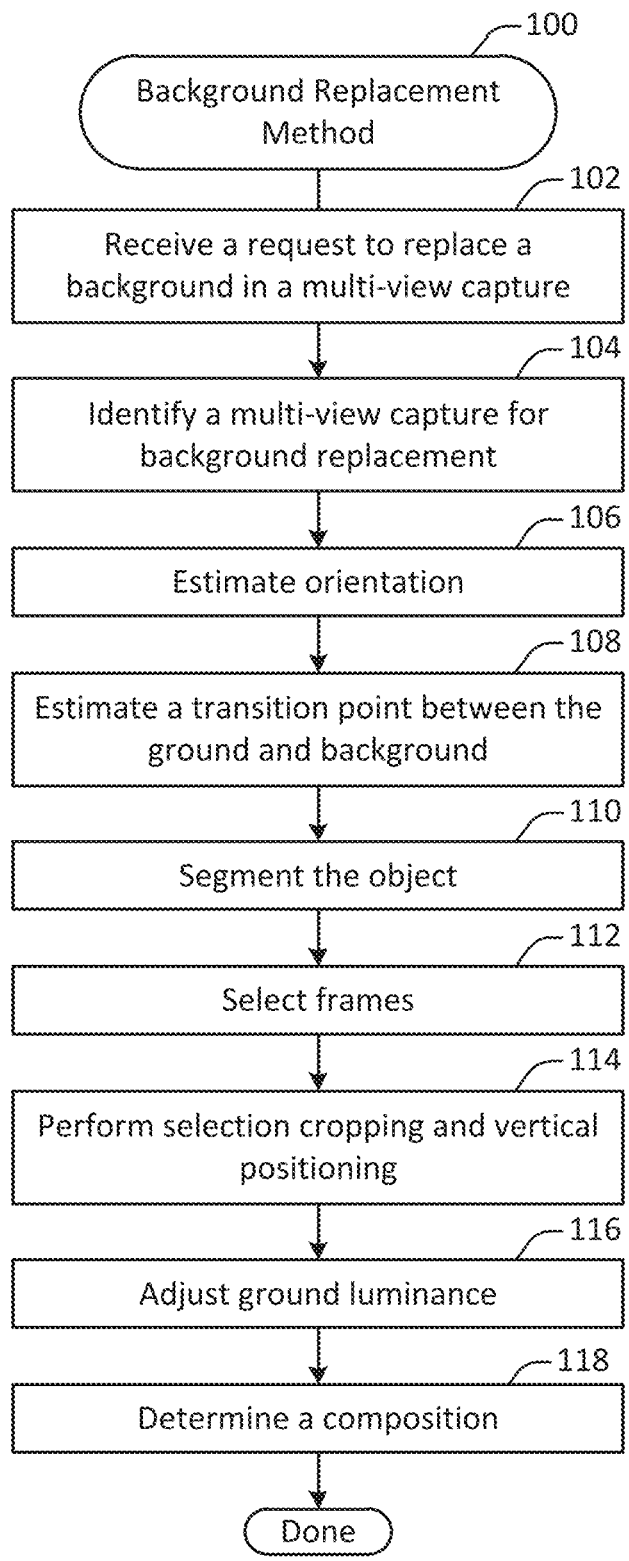
FIG. 1 illustrates one example of a background replacement method, performed in accordance with one or more embodiments.

According to various embodiments, techniques and mechanisms described herein may facilitate changing the background in a single-image or multi-view capture into a custom environment. Changing the background may involve placing an object into a customer environment or inserting an artificial wall behind the object to occlude unwanted background. The new background is referred to herein as a target background. In some implementations, the new background can be a rendered scene or a photo with its own ground.

In some embodiments, the target background can be an artificial wall that does not include a custom ground. When the target background lacks a ground portion, the original ground may be utilized as-is. Alternately, the original ground may be modified. For example, the original ground may be made to appear wet. As another example, the original ground may be replaced with a different image, such as an image of pavement. In some configurations, the source image ground and the target image ground may be combined, for instance to increase realism.

According to various embodiments, techniques and mechanisms described herein may facilitate altering a single-view or multi-view capture to focus viewer attention on one or more objects in the foreground and off of background clutter. For example, an object such as a vehicle may be captured in any environment and be presented instead in a representative, uniform environment. Such modifications may be performed with minimal user input.

For the purpose of illustration, one or more embodiments are discussed herein with reference to vehicles. According to various embodiments, a multi-view capture may be created for a vehicle by taking a number of images of the vehicle from different angles and then combining them to produce the multi-view capture. However, the techniques and mechanisms described herein are generally applicable to multi-view captures covering a wide variety of objects. Accordingly, the techniques and mechanisms described herein should not be construed as limited to vehicles, but rather should be interpreted as generally applicable to any suitable objects that may be depicted in an individual image or subject to a multi-view capture.

In some embodiments, techniques and mechanisms described herein may be applied to separate a single-image or multi-view capture of an object into one or more object components, one or more background components, and/or one or more ground components. For example, a photograph of a vehicle may be separated into a background component, a vehicle component, and a ground component.

In some implementations, automatic segmentation may be selected for a designated number of predetermined viewpoints. Each viewpoint may include an image of the object captured from a respective camera position. For example, a camera may be rotated around an object to capture images of the object from different positions. For instance, in the case of a vehicle, eight predetermined viewpoints may be used.

FIG. 1 illustrates a method 100 for background replacement, performed in accordance with one or more embodiments. According to various embodiments, the method 100 may be performed at a mobile computing device such as a smart phone. Alternately, the method 100 may be performed at a server in communication with a mobile computing device. The method 100 may be employed to perform background replacement for a set of predetermined viewpoints.

At 102, a request to replace a background in a multi-view capture is received. According to various embodiments, the request may be generated based on user input. For example, a user may provide user input via an app implemented on a smart phone.

In some implementations, the request may be generated automatically and/or dynamically. For example, the request may be generated as part of an automated process for performing post-capture processing on one or more images or multi-view captures.

In particular embodiments, the request may identify a target background with which to replace the source background. For example, the target background may be identified based on user input. As another example, a standard target background may be used for a set of images.

In some implementations, a target background may be identified automatically and/or dynamically. Additional details regarding automatic background selection are described with respect to the method 600 shown in FIG. 6.

At 104, a multi-view capture is identified for background replacement. In some implementations, the multi-view capture may be selected from one or more multi-view captures that have already been created. Alternately, a new multi-view capture may be created at 104. Additional details regarding multi-view representation construction and other features are discussed in co-pending and commonly assigned U.S. patent application Ser. No. 15/934,624, "Conversion of an Interactive Multi-view Image Data Set into a Video", by Holzer et al., filed Mar. 23, 2018, which is hereby incorporated by reference in its entirety and for all purposes.

Orientation estimation is performed at 106. In some implementations, orientation estimation may be used to extract specific view-points from the multi-view capture for which the background will be replaced. Various types of orientation estimation techniques may be employed. For example, a bounding box may be detected for each frame. An orientation for each bounding box crop may then be estimated using a neural network. The neural network may be specific to a particular type of object, such as a vehicle. Data from an inertial measurement unit (IMU) gathered during the multi-view capture may be used to refine the orientation information. The result may be a view angle of the depicted object (e.g., a vehicle) for each frame. For example, a frame may be associated with a view angle such as front 0-degree or back 180-degree. Additional details related to orientation detection are discussed with reference to FIGS. 10 and 11.

A transition point between the ground and background is estimated at 108. According to various embodiments, estimating such a transition point may involve estimating a camera pose. The camera pose may be estimated from image information and/or IMU information collected during multi-view capture. The estimated pose may include the camera position, camera viewing direction, the camera projection matrix, and/or camera distortion parameters for one or more of the frames.

In some implementations, estimating a transition point may involve estimating an object skeleton. For example, in the case of a vehicle, a bounding box may be detected for each frame. Then, a 2D car skeleton including such features as wheels, mirror, headlights, and other such components may be estimated for each bounding box crop using a neural network specific to vehicles. Additional details regarding skeleton detection and other features are discussed in co-pending and commonly assigned U.S. patent application Ser. No. 15/427,026, titled "Skeleton Detection and Tracking via Client-server Communication" by Holzer et al, filed Feb. 7, 2017, which is hereby incorporated by reference in its entirety and for all purposes.

Although the transition between the ground and background is described with respect to some embodiments disclosed herein as a point, other dividing mechanisms may be used. More generally, according to various embodiments the transition between the ground and background may be modeled as a gradient of arbitrary shape. For example, the gradient may be selected by using a point such as the bottom of the highest wheel. As another example, the gradient may take the shape of a line, a curve, or a half circle.

In some embodiments, 2D detection of each joint may be performed over all frames. Such information may then be triangulated using the pose information, yielding a 3D skeleton that can be projected onto the 2D frame. This approach may facilitate in reducing the noise involved in joint detection as well as in identifying invisible and/or occluded joints that are missing in the 2D detections. For example, the position of back wheels that are not visible in the frontal view may be determined.

Object segmentation is performed at 110. According to various embodiments, object segmentation may involve the creation of segmentation masks that separate a component or object from other components or aspects of an image.

In some implementations, segmentation may be performed on a per-frame basis. When using such an approach, a bounding box may be detected for each frame. Each bounding box crop may be independent segmented into a foreground and a background. For example, in the case of a vehicle, an image may be segmented into the vehicle (i.e. foreground) and the background using a neural network trained on images of vehicles.

Figure 7A:
FIGS. 7A, 7B, 8A, 8B, and 9 illustrate examples of images processed in accordance with one or more embodiments.
Figure 7B:

FIGS. 7A and 7B illustrate an example of such segmentation. FIG. 7A includes an image of a vehicle. FIG. 7B illustrates the same image of the vehicle after segmenting the image and applying an image mask to separate the foreground from the background.

In some implementations, segmentation may be performed on a multi-view capture basis. When using such an approach, camera pose information and per-frame segmentations may be performed to carve space resulting in a rough mesh of the object, such as a vehicle. The 3D object mesh may then be projected into each frame to obtain a consistent segmentation over all frames.

Returning to FIG. 1, frame selection is performed at 112. According to various embodiments, a frame may be selected for each of a set of predetermined viewpoints. For example, a vehicle may be associated with a predetermined viewpoint such as a frontal view. For such a viewpoint, a frame may be selected from a fixed interval spanning over the neighboring frames by identifying a frame proximate to the target orientation. In the case of a frontal view of a vehicle, the target orientation may be 0-degrees with respect to rotational perspective around the vehicle. The target orientation may be identified based on the orientation estimated at 106.

In some implementations, frame selection may involve first selecting a set of frames that span a fixed interval around the target orientation. Then, of the selected set of frames, one frame may be selected that maximizes the intersection-over-union (IoU) of the per-frame segmentation mask and the mask from the projected 3D mesh.

In particular embodiments, a frame may be selected based on the consistency of the object segmentation over multiple views. Such an approach may be particularly useful when the 3D reconstruction is below a designated quality threshold, potentially limiting the usefulness of the projected 3D mesh. In some embodiments, a frame may be selected based on orientation and/or segmentation quality.

In particular embodiments, frame selection may be omitted, and the projected representation determined at 110 may be used directly. For example, such an approach may be applicable when the 3D representation is particularly accurate. Such a 3D representation may be constructed based on executing a sophisticated 3D reconstruction pipeline and/or fitting a predetermined 3D model onto the images. Alternately, or additionally, per-frame object segmentation may be used, for instance when image quality is high and per-frame object segmentation is temporally consistent.

In particular embodiments, frame selection may be replaced with applying the techniques and mechanisms described herein to all frames within the multi-view capture identified at 104. In this way, a multi-view (e.g., a 360-degree view) of an object may be entirely updated with a target background or artificial wall.

Selection cropping and vertical position are performed at 114. According to various embodiments, cropping may be performed based on the information included in the 3D object skeleton. For example, in the case of a vehicle, the left, right, and bottom cropping boundaries may be determined based on identifying a predetermined distance from the most left, most right, and lowest wheels of the car.

In some implementations, vertical positioning may be performed based on the information included in the 3D object skeleton. For example, in the case of a vehicle, the vertical positioning of the vehicle may be determined based on the highest wheel. The transition gradient between the target background ground and the vehicle image ground may be positioned over the highest wheel at a predetermined distance from the wheel.

Figure 8A:
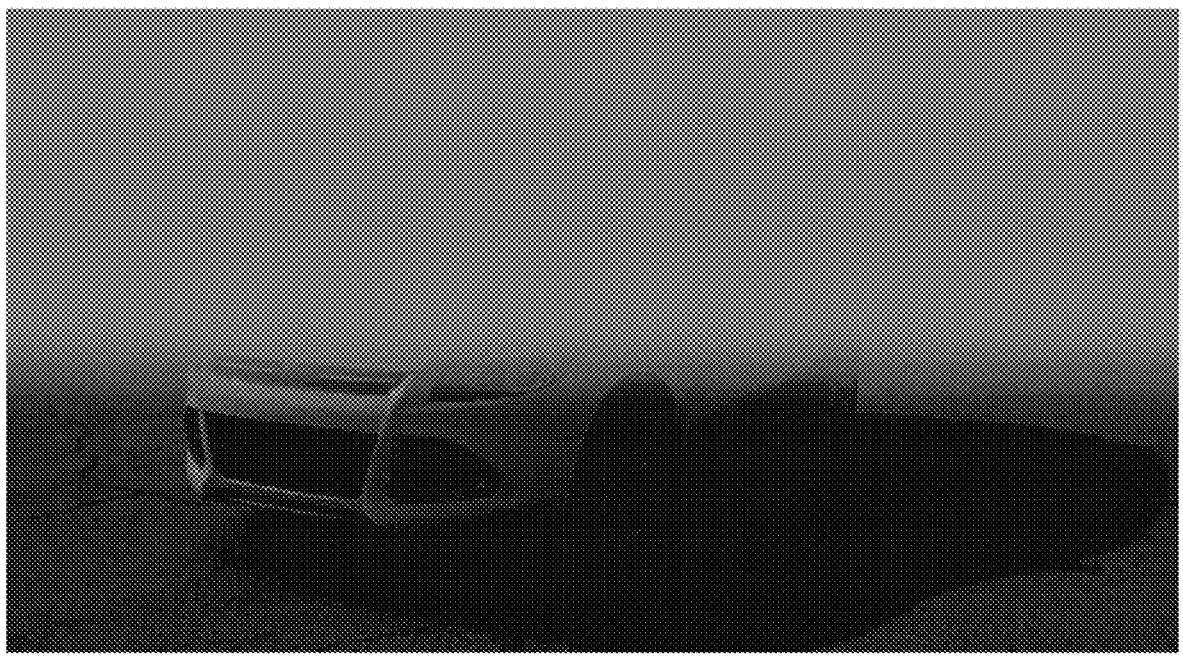
Figure 8B:

For example, FIG. 8A illustrates an image in which a vehicle has been cropped and vertically positioned. In FIG. 8A, the background has been cropped to facilitate replacement with the target background, which is illustrated in FIG. 8B.

Returning to FIG. 1, ground luminance and/or color is adjusted at 116. According to various embodiments, adjusting ground luminance and/or color may involve altering the luminance and/or color of the original ground to match the target background. Alternately, the original ground may be altered in some other way, such as to make it appear wet.

In some implementations, adjustments may be performed in CIELAB color space. The CIELAB color space is a color space defined by the International Commission on Illumination (CIE). It expresses color as three numerical values, L* for the lightness and a* and b* for the green-red and blue-yellow color components. Alternately, a different color space may be used.

In some implementations, adjustments may be performed to the histogram of the luminance and/or chroma channel. For example, to achieve a "wet" effect, the histogram of the luminance and/or chroma channel may be transformed to gain a predetermined mean luminance and/or color level. When matching a target background with visible ground, the histogram transformation may instead be defined so that the mean luminance and/or color level matches the mean luminance and/or color level of the ground of the target background.

In some embodiments, adjustments may be performed to one or more chroma channels. For example, the chroma channels (e.g., A and B) may be replaced with the channels from the target background. For the estimation of the histogram transformation, the area of the object (e.g., the vehicle) and the shadow (e.g., the vehicle shadow) may be excluded from adjustments to the luminance and/or chroma channels.

In some embodiments, the shadow may be automatically detected. For example, a shadow may be automatically detected by identifying a shape corresponding with a sharp difference in color within the ground of the image. As another example, a shadow may be automatically detected by identifying a shape corresponding with a fuzzy but significant difference in color within the ground of the image. Alternately, or additionally, all or a portion of the shadow may be marked by a user, for example by user input provided via a graphical user interface on a mobile computing device.

An example of adjustments to ground luminance and color is shown in FIG. 8A. In FIG. 8A, the ground underneath the vehicle has been adjusted in luminance and color to match the ground in the target background image shown in FIG. 8B. In particular, the ground in FIG. 8A has been darkened with respect to its original color in FIG. 7A to match the darker gray of the ground in front of the dealership in FIG. 8B.

In some implementations, adjustments other than ground luminance and/or color may be made. For example, characteristics such as the effect of wetness may be added, removed, or adjusted. As another example, content such as pavement marks, stones, leaves, or other such visual artifacts may be added or removed.

Returning to FIG. 1, a composition is determined at 118. In some implementations, a composition with a target background is created from back to front. First, the target background is added as a base layer. Then, the original ground with adjusted luminance and exchanged chroma channels is blended onto the target background layer with a gradient that is vertical, circular (e.g., to form a semi-circle), or other suitable shape. Next, the object is cut out of the original image and superimposed onto the composition.

According to various embodiments, a composition with an artificial wall is also created from back to front. First, the original image is applied with adjusted luminance and/or color channels (e.g., for a wet ground effect). Then, the artificial background wall is imposed. Next, the object is cut out of the original image and superimposed onto the composition.

In particular embodiments, as an alternative to a fixed target background, multiple backgrounds with corresponding view-points may be used. When using such an approach, navigating the multi-view image to view the object from different viewpoints may result in viewing different backgrounds for different viewpoints. For example, different backgrounds may be captured by taking photographs from the same location but from different angles. In the case of a vehicle, the resulting multi-view composition may then show the vehicle in front of a dealership but allow the user to view the vehicle from different angles, with the background changing accordingly as the viewpoint changes.

In particular embodiments, creating the composition may involve constructing or altering a shadow. For example, in the case of a target background image, the original image ground could be replaced by the target ground. In such a situation, an artificial shadow may be added. For instance, as an artificial shadow may be created based on the original shadow. As another example, a shadow may be removed from the image by masking it and applying image in-painting to fill the masked region.

In particular embodiments, the creation and/or removal of a shadow may be performed based on the 3D object mesh created at 110, based on a CAD model, or based on any other suitable information. The direction and/or size of the artificial shadow may be adapted to existing shadows in the target background image.

In some embodiments, direction of the artificial shadow may be based on the time, location, and/or orientation of the capture. Such an approach may allow for the computation of the position of the sun relative to the cameras.

Figure 9:

An example of a completed composition is shown in FIG. 9. The completed composition includes the target background vehicle dealership as a replacement for the original image background. In addition, the original ground has been darkened to match the ground of the target background. Finally, the vehicle has been placed in the foreground of the composition.

Figure 2:
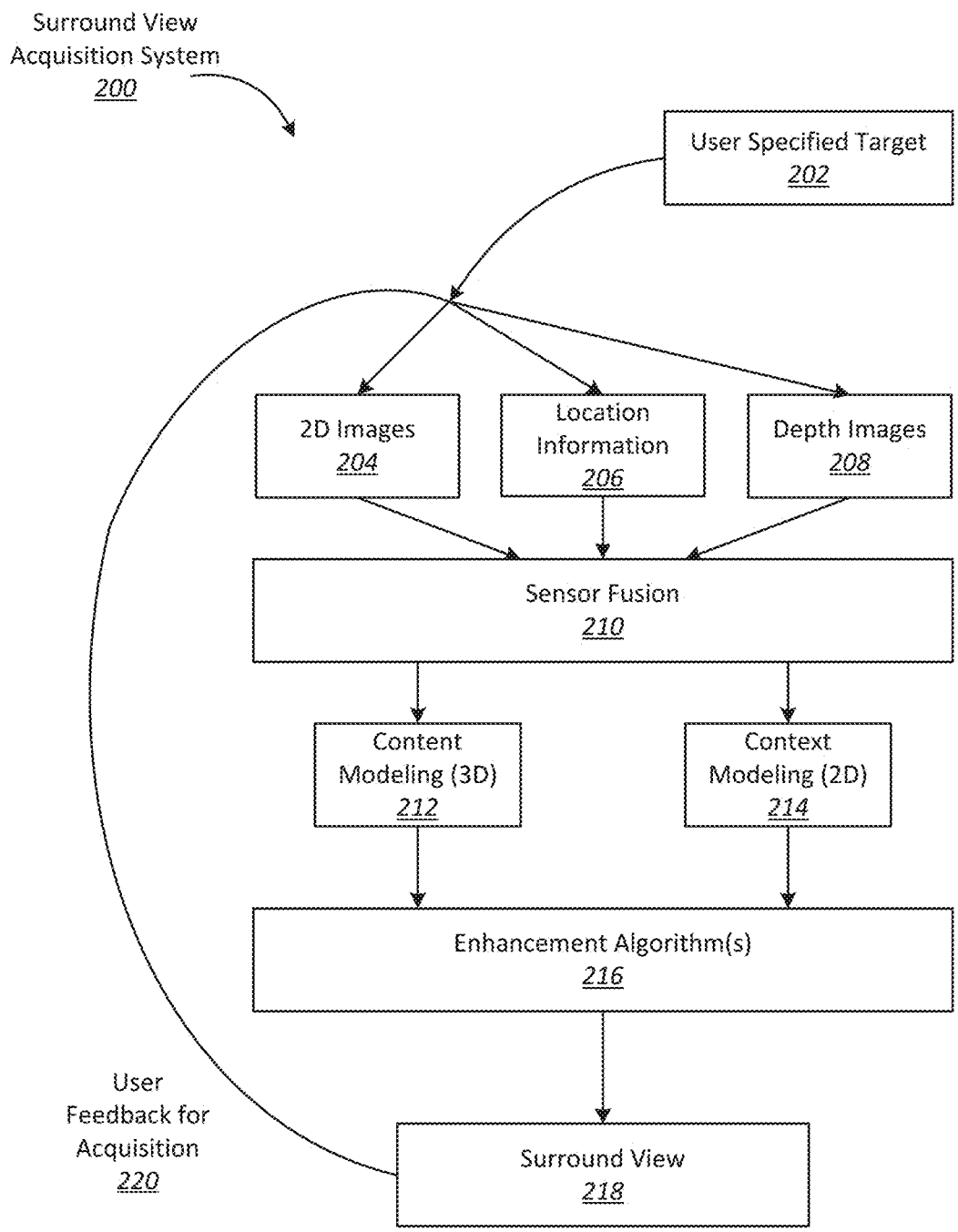
FIG. 2 illustrates an example of a surround view acquisition system configured in accordance with various embodiments.

With reference to FIG. 2, shown is an example of a surround view acquisition system that can be used to generate a multi-view interactive digital media representation that can be used for the application of filters or visual effects. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 200 is depicted in a flow sequence that can be used to generate a surround view. According to various embodiments, the data used to generate a surround view can come from a variety of sources. In particular, data such as, but not limited to two-dimensional (2D) images 204 can be used to generate a surround view. These 2D images can include color image data streams such as multiple image sequences, video data, etc., or multiple images in any of various formats for images, depending on the application. Another source of data that can be used to generate a surround view includes location information 206. This location information 206 can be obtained from sources such as accelerometers, gyroscopes, magnetometers, GPS, Wi-Fi, IMU-like systems (Inertial Measurement Unit systems), and the like. Yet another source of data that can be used to generate a surround view can include depth images 208. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 210. In some embodiments, a surround view can be generated a combination of data that includes both 2D images 204 and location information 206, without any depth images 208 provided. In other embodiments, depth images 208 and location information 206 can be used together at sensor fusion block 210. Various combinations of image data can be used with location information at 206, depending on the application and available data.

In the present example embodiment, the data that has been fused together at sensor fusion block 210 is then used for content modeling 212 and context modeling 214. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 212 and context modeling 214 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 202 can be chosen. It should be noted, however, that a surround view can be generated without a user specified target in some applications.

In the present example embodiment, one or more enhancement algorithms can be applied at enhancement algorithm(s) block 2:16. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points car be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 216. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 218 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in applying filters or visual effects.

According to various example embodiments, once a surround view 218 is generated, user feedback for acquisition 220 of additional image data can be provided. In particular, if a surround view is determined to need additional views to provide a more accurate model of the content or context, a user may be prompted to provide additional views. Once these additional views are received by the surround view acquisition system 200, these additional views can be processed by the system 200 and incorporated into the surround view.

Figure 3:
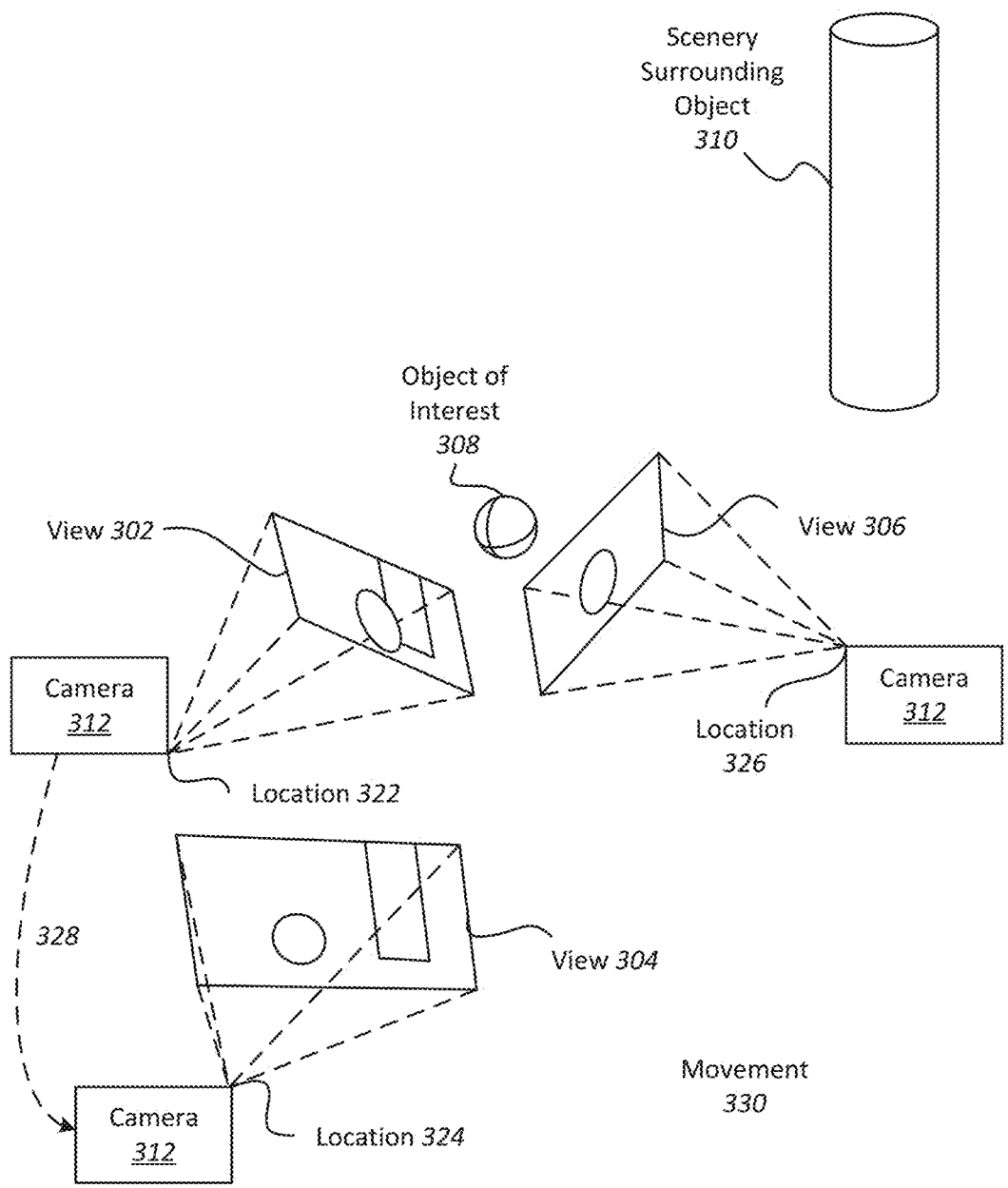
FIG. 3 illustrates an example of a surround view acquisition system configured in accordance with various embodiments.

With reference to FIG. 3, shown is an example of a device capturing multiple views of an object of interest from different locations. The capture device is indicated as camera 312, and moves from location 322 to location 324 and from location 324 to location 326. The multiple camera views 302, 304, and 306 captured by camera 312 can be fused together into a three-dimensional (3D) model. According to various embodiments, multiple images can be captured from various viewpoints and fused together to provide a multi-view digital media representation.

In the present example embodiment, camera 312 moves to locations 322, 324, and 326, respectively, along paths 328 and 330, in proximity to an object of interest 308. Scenery can surround the object of interest 308 such as object 308. Views 302, 304, and 306 are captured by camera 312 from locations 322, 324, and 326 and include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 308. View 304 shows the object of interest 308 to one side of the cylinder, and view 306 shows the object of interest without any view of the cylinder.

In the present example embodiment, the various views 302, 304, and 306 along with their associated locations 322, 324, and 326, respectively, provide a rich source of information about object of interest 308 and the surrounding context that can be used to produce a multi-view digital media representation, such as a surround view. For instance, when analyzed together, the various views 302, 304, and 306 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 308 into content and the scenery 310 as the context. In particular examples, the content can then be used for applying filters.

Figure 4:
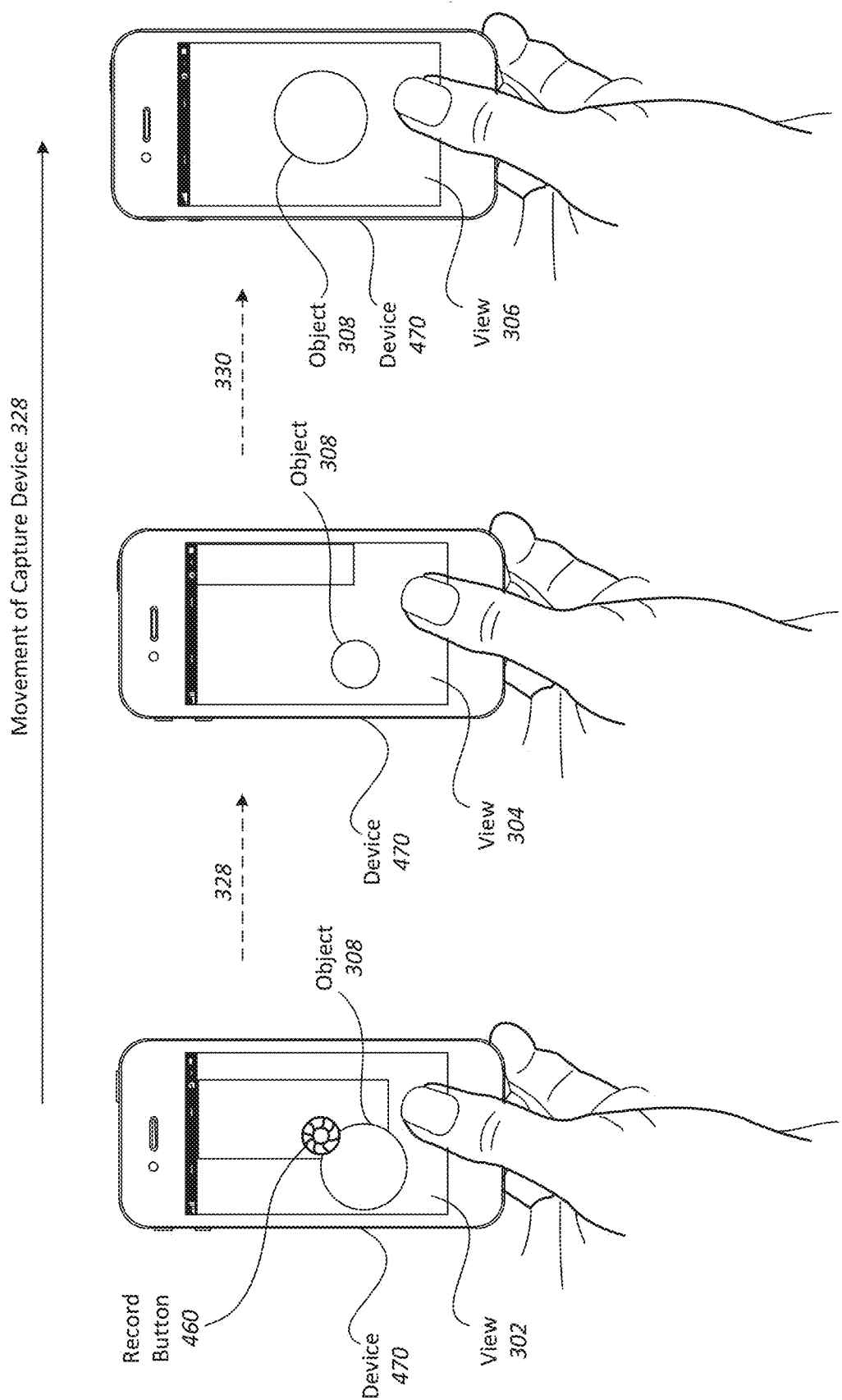
FIG. 4 illustrates an example of a device capturing multiple views of an object of interest.

With reference to FIG. 4, shown is an example of a device capturing views of an object of interest. During a filter session, multiple views of the object 408 may be captured by the device 470 from different locations. In the present example, data is acquired when a user taps a record button 480 on capture device 470 to begin recording images of the object.

The user moves 328 the capture device 470 from location 322 to location 324 along path 328 and from location 324 to location 326 along path 330. As described in more detail throughout this application, filtering can be provided at the device 470, and prompts for the user to capture particular views can be provided during the session. In particular, the system can prompt the user to move the device 470 in a particular direction or may prompt the user to provide additional information. As the user records different views of the object, filtering suggestions may be reiteratively refined to provide accurate results. The user may choose to stop recording by tapping the record button 480 again. In other examples, the user can tap and hold the record button during the session, and release to stop recording. In the present embodiment, the recording captures a series of images that can be used to generate a multi-view digital media representation that can be for filtering either in real-time or after-the-fact.

In some implementations, applying a filter to a multi-view digital media representation may involve processing a succession of images taken from different perspectives. In such an example, the client device may perform low-level processing such as two-dimensional analysis of individual images. The server, on the other hand, may perform high-level processing such as combining different individual images to produce a three-dimensional model of an object that is the subject of a multi-view video.

Figure 5:
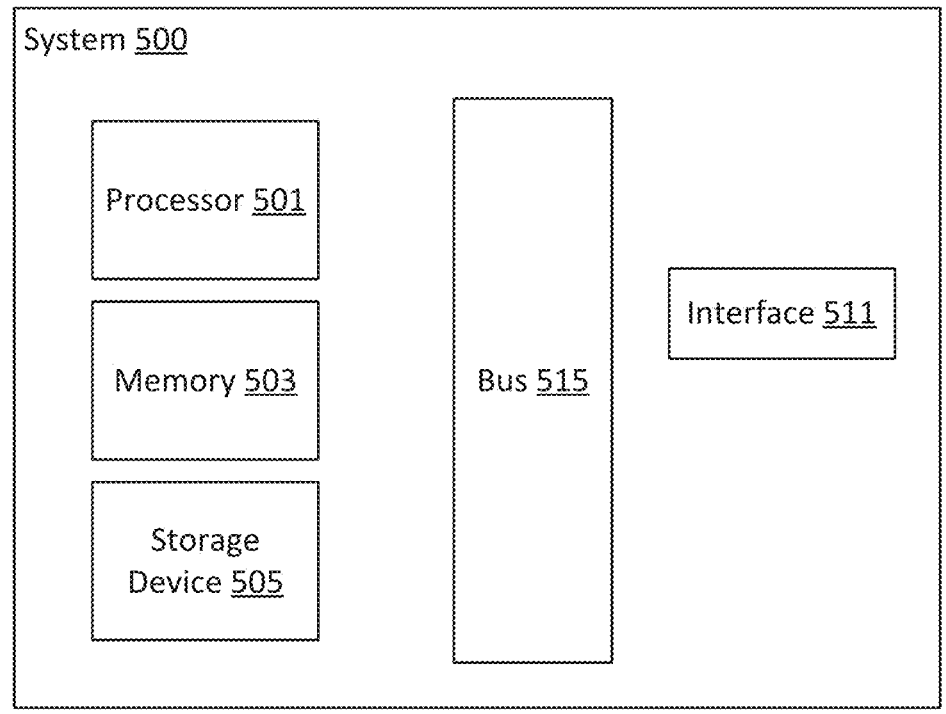
FIG. 5 illustrates a particular example of a computer system configured in accordance with various embodiments.

With reference to FIG. 5, shown is a particular example of a computer system that can be used to implement particular examples of the present invention. For instance, the computer system 500 can be used to map views between images according to various embodiments described above. According to particular example embodiments, a system 500 suitable for implementing particular embodiments of the present invention includes a processor 501, a memory 503, a communications interface 511, and a bus 515 (e.g., a PCI bus). The interface 511 may include separate input and output interfaces, or may be a unified interface supporting both operations. When acting under the control of appropriate software or firmware, the processor 501 is responsible for such tasks such as optimization. Various specially configured devices can also be used in place of a processor 501 or in addition to processor 501. The complete implementation can also be done in custom hardware. The communications interface 511 is typically configured to send and receive data packets or data segments over a network. Particular examples of interfaces the device supports include Ethernet interfaces, frame relay interfaces, cable interfaces, DSL interfaces, token ring interfaces, and the like. The storage device 505 is configured to store information on one or more non-transitory storage media such as a hard disk or network attached storage system.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 6:
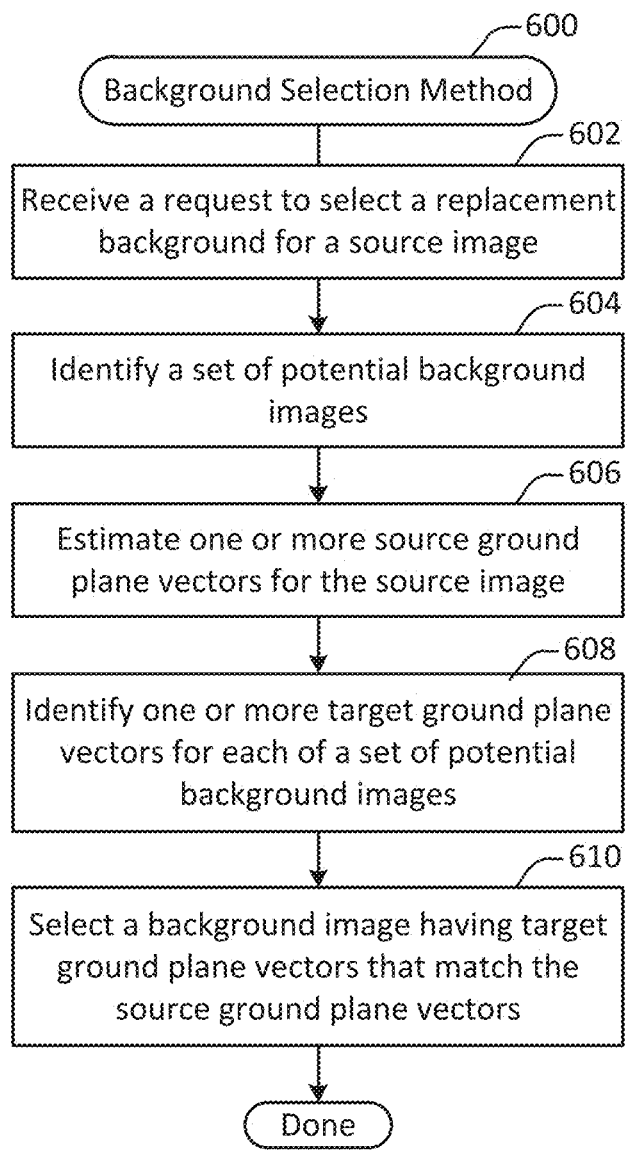
FIG. 6 illustrates one example of a background selection method, performed in accordance with one or more embodiments.

FIG. 6 illustrates one example of a background selection method 600, performed in accordance with one or more embodiments. In some implementations, the method 600 may be performed to select a background automatically, for instance based on the characteristics of the source image.

At 602, a request to select a replacement background for a source image is received. According to various embodiments, the request may be generated based on user input. Alternately or additionally, the request may be generated automatically, for instance during a background image replacement procedure as discussed with respect to the operation 102 in FIG. 1.

A set of potential background images are identified at 604. In some implementations, a target background may be selected form a set of available backgrounds. For example, a set of standard background images may be selected to fit the context of a particular object or set of objects. For instance, the source background behind a vehicle may be replaced with one of a set of potential background images of a car dealership.

In particular embodiments, the potential background images may be identified automatically. For example, object detection may be used to identify the object in a single-view or multi-view capture. The object identity may then be used to identify a set of background images suitable for the object. For instance, a set of potential background images of a car dealership may be identified when the object is a vehicle, while a set of vases and countertops may be identified when the object is a bunch of flowers.

One or more source ground plane vectors are estimated for the source image at 604. One or more target ground plane vectors for each of a set of potential background images are identified at 606. According to various embodiments, estimating the ground plane vectors may be performed using information such as IMU data, a 3D reconstruction, and/or a depth map.

In particular embodiments, the background may be newly created by a rendering a textured 3D mesh or a composition of meshed. The camera pose used for rendering the artificial scene may be selected so the ground plane vectors in rendered scene and source image match.

At 610, a background image is selected having target ground plane vectors that match the source ground plane vectors. According to various embodiments, by selecting a target background in this way, the system may avoid constructing a composition that exhibits an incongruous perspective between the original foreground image and the target background image.

The method 600 in FIG. 6 is described as matching the source image to the target background image based on ground plane vectors. However, other image attributes may be used instead of, or in addition to, ground plane vectors. These other image attributes may include, but are not limited to: color harmony, object type, object subtype, and/or any other suitable characteristics of the object or image.

In particular embodiments, backgrounds may be selected based on object-specific characteristics. For example, in the case of a vehicle a dealership image may be selected that fits the brand of the imaged vehicle. As another example, if an artificial background (e.g., a rendered scene) is employed, then the background of the scene may be adapted to match object characteristics.

According to various embodiments, one or more of the operations shown in FIG. 6 may be performed in an order different than that shown. For example, the operations 606 and 608 may be performed in reverse order, or in parallel.

In some implementations, one or more of the operations shown in FIG. 6 may be omitted. For example, one or more of the target ground plane vectors may be estimated as part of the execution of the method 600. Alternately, one or more of the target ground plane vectors may be predetermined and retrieved at operation 608.

According to various embodiments, techniques and mechanisms described herein are described with respect to a multi-view image capture with IMU input. However, techniques and mechanisms described herein may also be applied to support single-image input. For example, instead of estimating a 3D skeleton from the 2D detection of the multiple views, a 3D skeleton may be estimated directly from a single view. Such an approach may be used in the situation where a specialized neural network is available to match the subject of the single image.

In some implementations, applying techniques and mechanisms described herein to a single-image input may involve fitting a CAD model into the image and deriving the skeleton joints from the positions of the components of the model. For example, a CAD model of a vehicle may be fitted into an image of the vehicle, and the skeleton joints of the vehicle may be derived from the positions of the vehicle parts in the model. As another example, a pre-trained neural network may be used to fit a CAD model onto the image and derive the skeleton joints. As yet another example, a 3D mesh and/or CAD model may be directly estimated with matching camera parameters from a single image or multiple images using a neural network.

In some implementations, applying techniques and mechanisms described herein to a single-image input may involve cropping and positioning the object based on the 2D skeleton detection directly. For example, a 2D skeleton of an object in an image may be estimated based on a single image, and then the image may be cropped and positioned based on the skeleton.

According to various embodiments, techniques and mechanisms described herein are described with respect to IMU data. However, techniques and mechanisms described herein may also be applied to function in the absence of IMU data. For example, the orientation of an object such as a vehicle may be determined directly from a vehicle skeleton, a vehicle mesh, and/or a vehicle CAD model.

Figure 10:
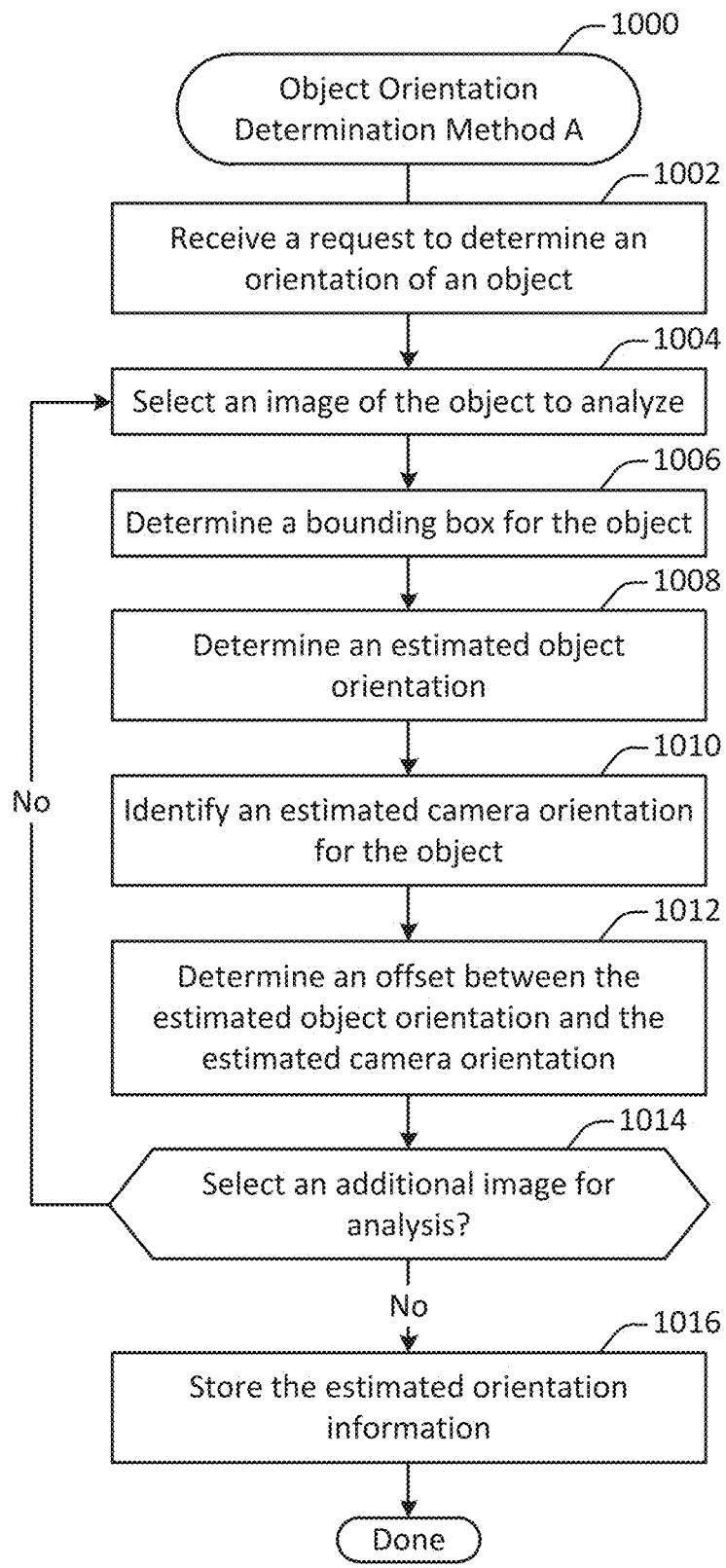
FIG. 10 illustrates a first method for determining object orientation, performed in accordance with one or more embodiments.

FIG. 10 illustrates a method 1000 of determining an orientation of an object, performed in accordance with one or more embodiments. The method 1000 may be performed on any suitable computing device. For example, the method 1000 may be performed on a mobile computing device such as a smart phone. Alternately or additionally, the method 1000 may be performed on a remote server in communication with a mobile computing device.

A request to determine an orientation of an object is received at 1002. According to various embodiments, the request may be received at a user interface. For example, the request may be received via an application at a mobile computing device. As another example, the request may be received at a user interface at a laptop.

At 1004, an image of the object is selected for analysis. According to various embodiments, the image may be a single two-dimensional image of the object. Alternately or additionally, the image may be one of a series of two-dimensional images of the object captured from different viewpoints. In some implementations, the image may be a single frame of a video stream of the object. In some embodiments, the image may be a 360-degree multi-view capture of the object. Alternately, the image may include a view that has less than 360-degree coverage.

Optionally, a bounding box for the object is determined at 1006. According to various embodiments, a bounding box for the object may include coordinates of a rectangular or non-rectangular border that encloses the object in the selected image. The bounding box may be determined by a neural network. For example, a neural network may be trained to determine the coordinates of the visible object pixels in an image of the object. The neural network may facilitate the determination of the pixel coordinates and the width, height, or other characteristics of the bounding box enclosing the object. Alternately or additionally, the bounding box may be determined by a different type of algorithm. In some configurations, the bounding box may be determined at least in part based on user input. For example, the bounding box may be determined by a user super-imposing a border on the image to enclose the object. In another example, the bounding box may be determined by the user tapping on the object with an algorithm automatically estimating the extent of the bounding based on the selection. In yet another example, the user may select points or regions in the foreground and background, and an algorithm automatically separates both to estimate the extent of a corresponding bounding box.

At 1008, an estimated object orientation is determined. According to various embodiments, the estimated object orientation may be determined by a neural network. For example, a neural network may be trained to determine the estimated object orientation through an analysis of the object from one or more images of an object. The estimated object orientation may include estimates about an object's roll, elevation, angular position, attitude, and azimuth angle.

An estimated camera orientation is identified at 1010. According to various embodiments, camera orientation may be estimated from data collected from an inertial measurement unit (IMU). In some implementations, the IMU may be associated with a mobile computing device, such as a smartphone. For example, a mobile computing device may include sensors such as a camera capable of capturing visual data such as an image or video stream. A mobile computing device may also include an accelerometer, a gyroscope, and other such sensors capable of capturing IMU data. IMU data may include information such as camera location, camera angle, device velocity, device acceleration, or any of a wide variety of data collected from accelerometers or other such sensors.

In some implementations, IMU orientation may identify orientation information associated with the camera. The IMU orientation may then be used to infer orientation information about the object. For example, the IMU orientation may indicate that the image was captured with a camera located at a particular height and angle relative to the object and/or ground. Alternatively, or additionally, the orientation estimation might be done using a pose estimation algorithm based on image data. In some configurations, the pose estimation method might also consider the available IMU data.

At 1012, an offset is determined between the estimated object orientation and the estimated camera orientation. According to various embodiments, the determination may be made at least in part by identifying a difference between the two values. Alternately, or additionally, the determination may be made at least in part by refining the object orientation based on additional information characterizing the position and angle of the camera.

A determination is made at 1014 as to whether to select an additional image of the object for analysis. In some implementations, additional images may be selected until all available images have been analyzed. For example, each image associated with a multi-view capture may be analyzed. If multiple images have been processed, then a combined offset may be to be calculated. For example, the offset can be averaged from the results obtained from multiple images. In another example, a robust method for estimating the final offset from multiple computed offsets might be used, for instance to handle outliers such as an inaccurate orientation estimation for certain images.

In some embodiments, the determination made at 1014 may be made at least in part automatically. For example, the estimated object orientation procedure at 1008 may attempt to estimate an orientation for the object, but may fail due to incomplete image information or other information. A determination may be automatically made to prompt the user to capture or upload additional images of the object.

In some implementations, the determination made at 1014 may be made at least in part as a request by a user. For example, a user may be prompted to select an additional image for analysis. Alternatively or additionally, a user may be prompted to review an estimated object orientation, and a user may review the estimated object orientation and may elect to analyze additional images of the object in order to improve the accuracy or quality of the estimated object orientation. In some implementations, every N-th frame of the multi-view capture might be processed.

At 1016, the orientation estimation information is stored. According to various embodiments, storing the orientation estimation information may involve storing one or more orientation values for each of the images analyzed in FIG. 10. For example, orientation information may be stored to supplement a multi-view capture.

In some implementations, the orientation estimation may be stored on a storage device. Alternately, or additionally, the orientation estimation may be transmitted to a remote location via a network.

According to various embodiments, one or more operations shown in FIG. 10 may be omitted. For example, any or all of operations 1010 and 1012 may be omitted.

Figure 11:
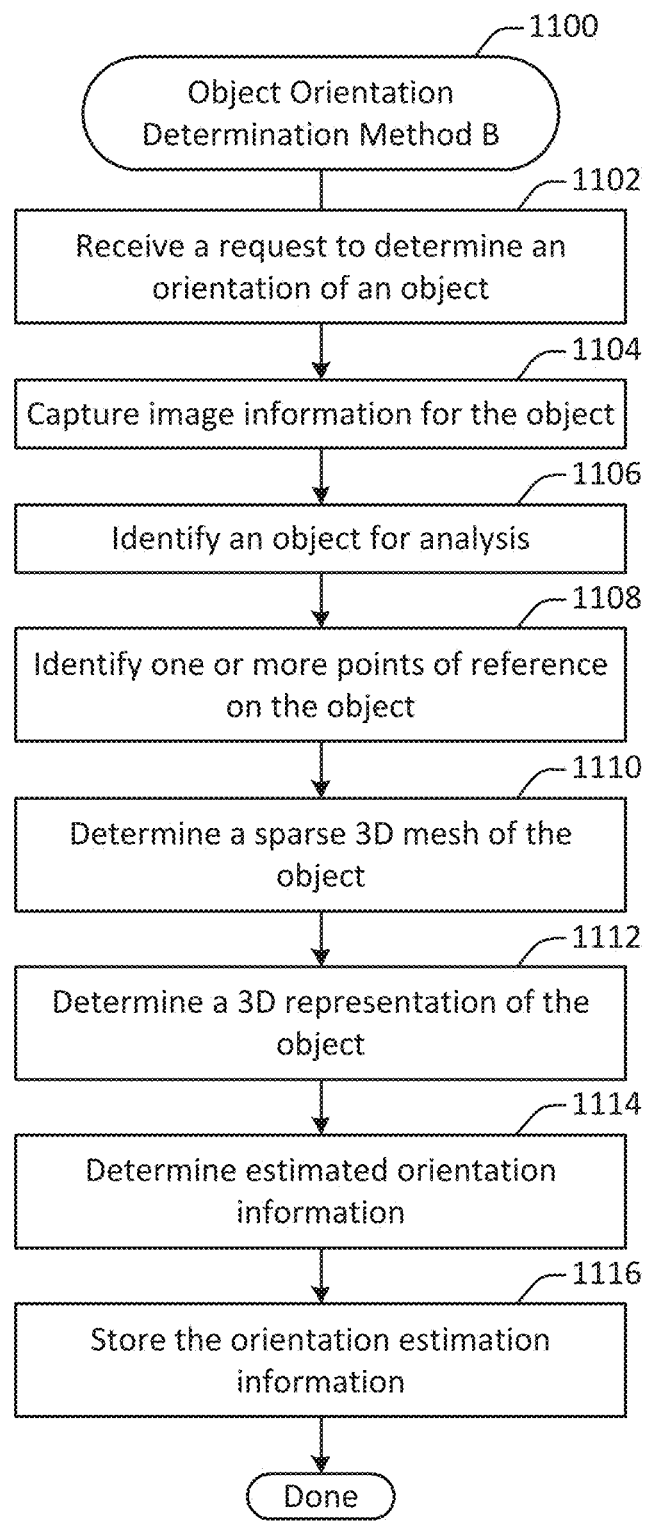
FIG. 11 illustrates a second method for determining object orientation, performed in accordance with one or more embodiments.

FIG. 11 illustrates a method for determining an object orientation based on 3D data. The method 1100 may be performed on any suitable computing device. For example, the method 1100 may be performed on a mobile computing device such as a smart phone. Alternately or additionally, the method 1100 may be performed on a remote server in communication with a mobile computing device.

A request to determine an orientation of an object is received at 1102. In some implementations, the request may be received at a user interface. At 1104, image information for the object is captured. In some implementations, the image information may include a video or image set of the object is captured from multiple perspectives. The image information may include a 360-degree view of the object. Alternately, the image information may include a view that has less than 360-degree coverage.

An object is identified for analysis at 1106. In some embodiments, the object may be identified via an algorithm. For example, the object may be identified via an image recognition algorithm. As another example, the object may be identified via a bounding box algorithm.

In some implementations, the object may be identified based at least in part on user input. For instance, a user may identify the object as a vehicle via a user interface component such as a drop-down menu.

At 1108, one or more points of reference are identified on the object. According to various embodiments, points of reference may include one or more fiducial points on the object. Fiducial points are identifiable locations on objects of a particular type that in general should be present on all or nearly all objects of that type and that provide an indication as to the object's orientation. For example, in the case of a vehicle, fiducial points may include but are not limited to the vehicle's headlights, rearview mirror, and wheels.

In some implementations, the reference points may be identified via an algorithm, such as an image recognition algorithm. Alternately or additionally, reference points may be identified in part through user input.

A sparse 3D mesh of an object is determined at 1110. According to various embodiments, the sparse 3D mesh may be determined by using the fiducial points identified in operation 1108 as vertices of the mesh. For example, each face of the mesh may approximate the object shape with a planar surface.

At 1112, a 3D representation of the object is determined. According to various embodiments, the 3D representation may be constructed by elevating the fiducial points to 3D space and constructing a sparse 3D mesh from their locations. Alternately, or additionally, the object's orientation may be inferred based on cues such as surface normal of the faces of the mesh, visibility states of the fiducial points in a plurality of image, or other such features.

In some embodiments, the elevation into 3D space might be done using triangulation. Alternately, or additionally, a depth map might be computed for each frame which is then used to elevate the 2D points into 3D.

According to various embodiments, the 3D representation may be a 3D skeleton. For example, 2D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from one or more 2D skeletons and/or one or more 3D models.

According to various embodiments, the 3D reconstruction of the object surface may include one or more of a variety of reconstruction procedures. For example, dominant axes may be computed to estimate orientation. As another example, an object model such as a vehicle model that has a reference orientation may be fit into a 3D reconstructed model based on the input data. As another example, one or more parts of a 3D reconstructed model may be classified to estimate an orientation of the object.

Estimated orientation for the object is determined at 1114. According to various embodiments, the estimated object orientation may be determined by a neural network. For example, a neural network may be trained to determine the estimated object orientation through an analysis of the object from one or more images of an object. The estimated object orientation may include estimates about an object's dominant axes, roll, elevation, angular position, attitude, and azimuth angle.

According to various embodiments, the object orientation may be estimated based on the sparse 3D mesh determined at operation 1110 and/or the 3D skeleton determined at operation 1112. For example, the fiducial points identified in operation 1108 facilitate the triangulation of fiducial points of the object in 3D space to help determine the azimuth, roll, elevation, and axes of the designated object. The 3D skeleton may facilitate the inference of the object's orientation based on cues such as, but not limited to, the surface normals of the faces of the mesh, and the visibility states of the fiducial points in the images of the object, and information about the three axes of the 3D skeleton model determined at operation 1112.

In some embodiments, the estimated object orientation may be determined based on a 3D reconstruction of the object. For example, the object orientation may be estimated based on the dominant axes of the 3D reconstruction of an object. As another example, the orientation for a designated object may be estimated by incorporating the orientation of a known reference object with reference orientation with a 3D reconstructed model of the designated object. As yet another example, parts of the 3D reconstructed model may be identified to determine orientation of the object. For example, in the case of a vehicle, the license plate may be identified as a reference point relative to the rearview mirror to estimate the orientation of the vehicle.

At 1116, the orientation estimation information is stored. In some implementations, the orientation estimation may be stored on a storage device. Alternately, or additionally, the orientation estimation may be transmitted to a remote location via a network.

According to various embodiments, the object orientation may be estimated based on the determination of specific reference points on the object. For example, in the case of a vehicle, a specific reference point such as the license plate may be detected in one or more images of a multi-view image set. Based on the location of the license plate in the image relative to other reference points, such as the vehicle's headlights, the orientation of the object may be inferred.

In some implementations, this determination may be performed on a 3D model of the object. For example, for a 3D model of a vehicle, the location of the license plate may be used to estimate global angle for the vehicle. Alternately, or additionally, the trajectory of a feature such as a license plate may be fit to an ellipse in image space, which corresponds to a sphere around the vehicle in 3d space, and the location on the ellipse is used to estimate the vehicle's orientation.

In some embodiments, the estimated object orientation may be determined from a single image. In some implementations, the object may not be visible from all angles or perspectives from a single image, or an image may not supply a minimum number of reference points visible to determine a sparse 3D mesh capable of facilitating the determination of a 3D skeleton of the object. In such situations, a neural network may be trained to predict coordinates of the visible object pixels in a top-down view of the object.

In particular embodiments, once the locations are mapped, the points may be lifted to 3D based on a predefined correspondence between the top-down view and a 3D mesh. Then, the transformation between the image points and the 3D mesh may be used to obtain the 3D orientation of the vehicle.

According to various embodiments, the estimated object orientation may be determined from a single image via top-down view mapping. For example, a network may be trained that takes an image of an object such as a vehicle as input and maps every point of the image onto a top-down view. Based on the distribution of the points on the top-down view, the system may then draw an inference about the orientation of the object with respect to the camera.

According to various embodiments, orientation may be estimated from a single image using a component classifier. For example, a network may be trained to identify object components such as car parts. For instance, each pixel of the image may be classified as belonging to an object component or as part of the background. The visible object components may then be used to estimate an orientation of the object.

According to various embodiments, the object orientation may be directly estimated from the detected 2D skeleton by considering which joints of the 2D skeleton are detected (i.e. are visible).

In some implementations, the estimated object orientation may be determined from a single image via using a neural network trained directly to determine an N degree-of-freedom pose. For example, a 3 degree-of-freedom pose may include azimuth, roll, and elevation. As another example, a 6 degree-of-freedom pose may include 3 degrees of freedom for orientation and 3 degrees of freedom for translation. As another example, a combination of 3 degrees of freedom for translation and 3 degrees of freedom for position may be used. For instance, a 2 degree-of-freedom pose may include 1 degree-of-freedom for orientation and 1 degree-of-freedom for the distance between the camera and the object. Accordingly, the object may be translated, rotated, or otherwise adjusted in conjunction with performing background replacement.

In particular embodiments, any of the approaches involving a single image may be applied on a multi-view data set and the results combined (e.g., averaged) to improve the overall results. In general, any combination of the methods described herein may be used to increase robustness and/or provide a failsafe. For example, orientation may be independent estimated using three different methods, and then the results cross-checked.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

The invention claimed is:

1. A method comprising:
   determining via a processor at a mobile computing device a segmentation of an object depicted in a first visual representation that includes one or more images of the object captured via one or more cameras at a mobile computing device, the object being positioned within a three-dimensional environment, the object not being positioned in front of a two-dimensional patterned or monochromatic surface, the segmentation including for each image a first respective image portion that includes the object, the segmentation further including for each image a second respective image portion that includes a respective ground area located beneath the object, the segmentation further including a third respective image portion that includes a background area located above the second respective portion and behind the object;
   selecting a target background image based on a match between a first one or more ground plane vectors estimated for the target background image and a second one or more ground plane vectors estimated for the first visual representation;
   constructing a second visual representation based on the first visual representation via the processor at the mobile computing device, the second visual representation including the first respective image portion, the second visual representation including for each image a respective target background image portion that replaces the third respective image portion, the respective target background image portion being selected from one of the selected target background images based on an area of the third respective image portion relative to the respective image; and
   storing the second visual representation on a storage device.

2. The method recited in claim 1, the method further comprising:
   updating the second respective image portion based on one or more adjusted ground luminance values determined for the first visual representation, wherein the second visual representation includes the updated second respective image portion.

3. The method recited in claim 2, wherein the one or more adjusted ground luminance values are determined so as to match the second respective image portion to a designated ground portion of the target background image.

4. The method recited in claim 1, the method further comprising:
   updating the second respective image portion based on one or more color channel adjustment values determined for the first visual representation.

5. The method recited in claim 1, the method further comprising:
   updating the second respective image portion to remove one or more visual artifacts identified in the first visual representation.

6. The method recited in claim 1, the method further comprising:
   updating the second respective image portion to add the appearance of wetness.

7. The method recited in claim 1, the method further comprising:
   determining for each of the images an estimated orientation of the object relative to a respective viewpoint from which the respective image was captured.

8. The method recited in claim 1, the method further comprising:
   determining for each of the images an estimated transition boundary between the respective ground area and the respective background area.

9. The method recited in claim 1, wherein the first visual representation includes a plurality of images of the object, each of the images of the object being captured from a respective perspective view.

10. The method recited in claim 9, wherein the respective target background image portion associated with an image is determined based on the respective perspective view associated with the image.

11. The method recited in claim 9, wherein the first visual representation includes inertial measurement unit (IMU) data collected from an IMU in a mobile phone.

12. The method recited in claim 1, wherein the object is a vehicle.

13. The method recited in claim 1, wherein an updated position of the first respective image portion is determined based on an initial position of the first respective image portion, the updated position being selected from the group consisting of: a vertical translation, a horizontal translation, and a rotation.

14. The method recited in claim 1, wherein constructing the second visual representation includes cropping the first respective image portion.

15. A mobile computing device comprising:
   a processor configured to determine a segmentation of an object depicted in a first visual representation that includes one or more images of the object captured via one or more cameras at a mobile computing device, the object being positioned within a three-dimensional environment, the object not being positioned in front of a two-dimensional patterned or monochromatic surface, the segmentation including for each image a first respective image portion that includes the object, the segmentation further including for each image a second respective image portion that includes a respective ground area located beneath the object, the segmentation further including a third respective image portion that includes a background area located above the second respective portion and behind the object, wherein the processor is further configured to select a target background image based on a match between a first one or more ground plane vectors estimated for the target background image and a second one or more ground plane vectors estimated for the first visual representation;

a memory module configured to store a second visual representation based on the first visual representation via the processor at the mobile computing device, the second visual representation including the first respective image portion, the second visual representation including for each image a respective target background image portion that replaces the third respective image portion, the respective target background image portion being selected from one of the selected target background images based on an area of the third respective image portion relative to the respective image; and a storage device configured to store the second visual representation on.

16. The system recited in claim 15, wherein the processor is further configured to update the second respective image portion based on one or more adjusted ground luminance or color values determined for the first visual representation, wherein the one or more adjusted ground luminance or color values are determined so as to match the second respective image portion to a designated ground portion of the target background image.

17. The system recited in claim 15, wherein the processor is further configured to select the target background image based on one or more characteristics of the first visual representation, wherein the one or more characteristics include a first one or more ground plane vectors estimated for the target background image, and wherein the first one or more ground plane vectors match a second one or more ground plane vectors estimated for the first visual representation.

18. One or more non-transitory computer readable media having instructions stored thereon for performing a method, the method comprising:

determining via a processor at a mobile computing device a segmentation of an object depicted in a first visual representation that includes one or more images of the object captured via one or more cameras at a mobile computing device, the object being positioned within a three-dimensional environment, the object not being positioned in front of a two-dimensional patterned or monochromatic surface, the segmentation including for each image a first respective image portion that includes the object, the segmentation further including for each image a second respective image portion that includes a respective ground area located beneath the object, the segmentation further including a third respective image portion that includes a background area located above the second respective portion and behind the object;

selecting a target background image based on a match between a first one or more ground plane vectors estimated for the target background image and a second one or more ground plane vectors estimated for the first visual representation;

constructing a second visual representation based on the first visual representation via the processor at the mobile computing device, the second visual representation including the first respective image portion, the second visual representation including for each image a respective target background image portion that replaces the third respective image portion, the respective target background image portion being selected from one of the selected target background images based on an area of the third respective image portion relative to the respective image; and storing the second visual representation on a storage device.

* * * * *